(12) United States Patent
Liaw

(10) Patent No.: US 6,916,391 B2
(45) Date of Patent: Jul. 12, 2005

(54) ADHERING SEALING MEMBER TO METAL WITH WELD HEAT

(75) Inventor: Jeffrey Liaw, Aurora (CA)

(73) Assignee: Van-Rob, Inc., Aurora (CA)

( * ) Notice: Subject to any disclaimer, the term of this patent is extended or adjusted under 35 U.S.C. 154(b) by 118 days.

(21) Appl. No.: 09/995,876

(22) Filed: Nov. 29, 2001

(65) Prior Publication Data

US 2002/0162620 A1 Nov. 7, 2002

(30) Foreign Application Priority Data

May 1, 2001 (CA) .............................................. 2345890

(51) Int. Cl.[7] .............................................. B32B 31/20
(52) U.S. Cl. .......................... 156/66; 156/73.5; 156/92; 156/274.4
(58) Field of Search .......................... 156/66, 73.5, 91, 156/92, 274.4, 308.2, 308.4, 321, 322; 29/525.13, 525.14, 525.15; 411/81, 82, 368, 369, 370, 371.1, 533, 542; 228/139, 140; 470/3; 219/85.16, 243

(56) References Cited

U.S. PATENT DOCUMENTS

| | | | | |
|---|---|---|---|---|
| 2,512,426 A | * | 6/1950 | Hartley | ........................ 228/140 |
| 2,957,237 A | * | 10/1960 | Regle et al. | ................. 228/136 |
| 3,574,028 A | * | 4/1971 | Hurst et al. | .................. 156/228 |
| 3,792,567 A | | 2/1974 | Balcome | |
| 4,195,215 A | | 3/1980 | Clarke | |
| 4,834,828 A | | 5/1989 | Murphy | |
| 4,950,347 A | * | 8/1990 | Futagawa | ................. 156/272.4 |
| 4,958,857 A | | 9/1990 | Sixsmith | |
| 5,191,185 A | | 3/1993 | John, Jr. | |

* cited by examiner

Primary Examiner—Gladys JP Corcoran
(74) Attorney, Agent, or Firm—Riches, McKenzie & Herbert LLP

(57) ABSTRACT

A method of securing a sealing washer to one surface of a metal sheet while welding a head of a fastener to a second surface of a metal sheet, the method comprising: compressing the head onto the second surface of the sheet between a first electrode engaging the head and a second electrode engaging the first surface of the sheet, welding the head to the second surface of the sheet by electrical resistance welding to heat the first surface of the sheet proximate to the first electrode, urging a sealing washer into the heated first surface with the second electrode to heat the sealing washer and thereby bond the sealing washer to the first surface.

4 Claims, 10 Drawing Sheets

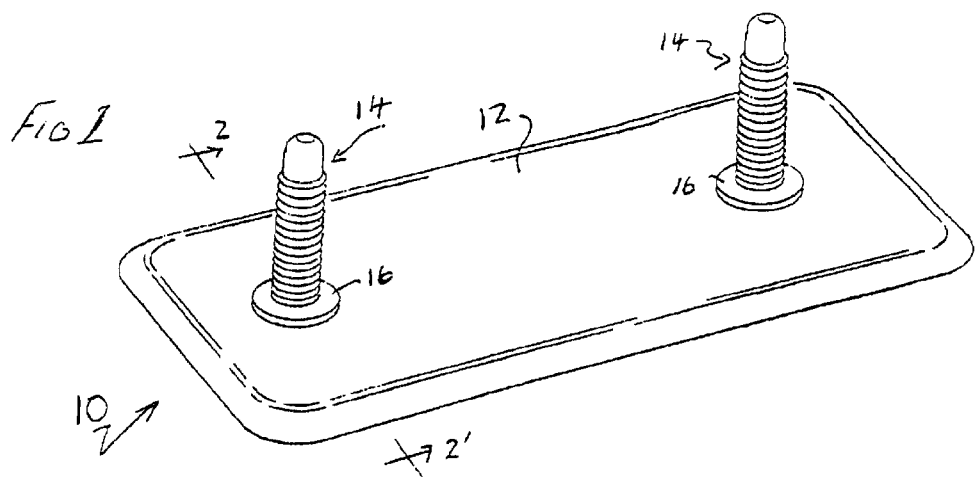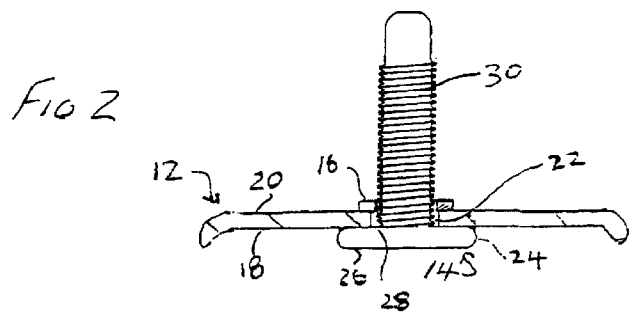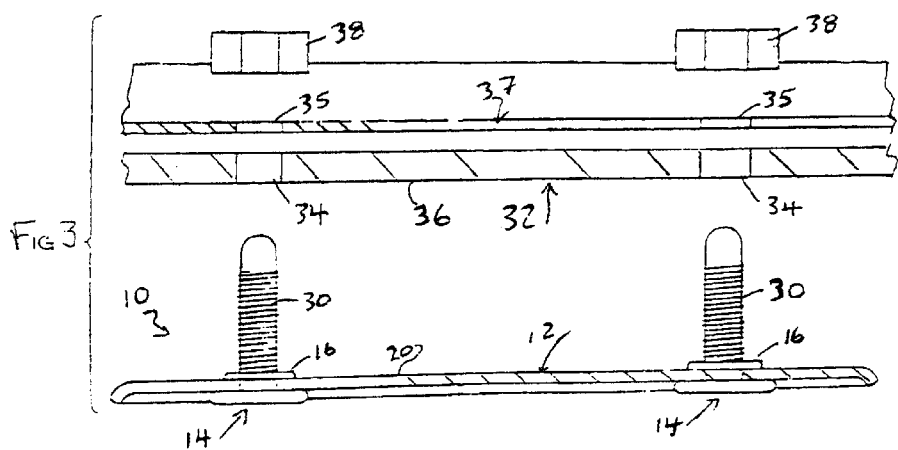

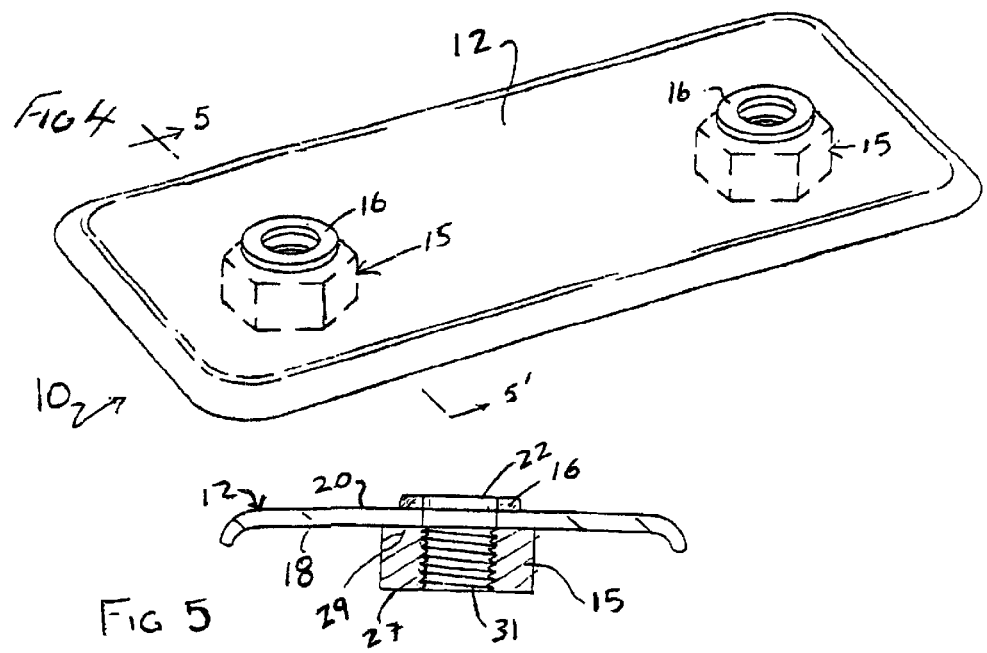
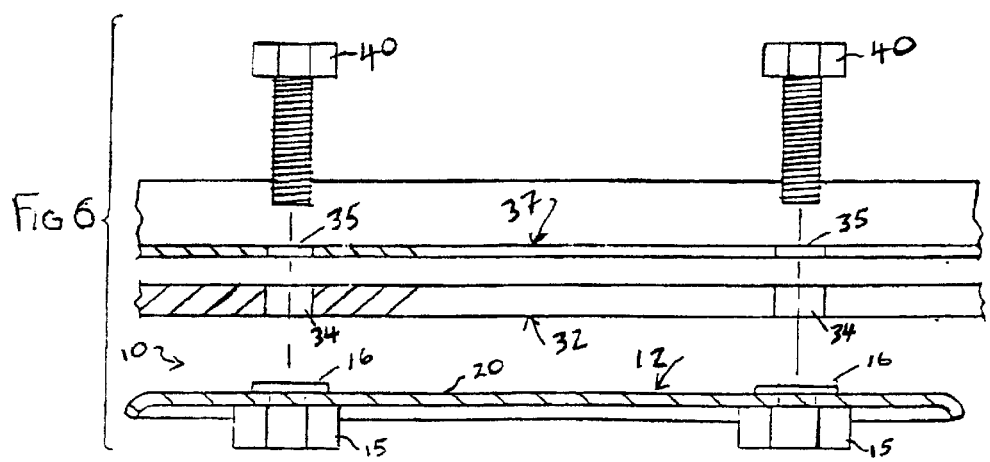

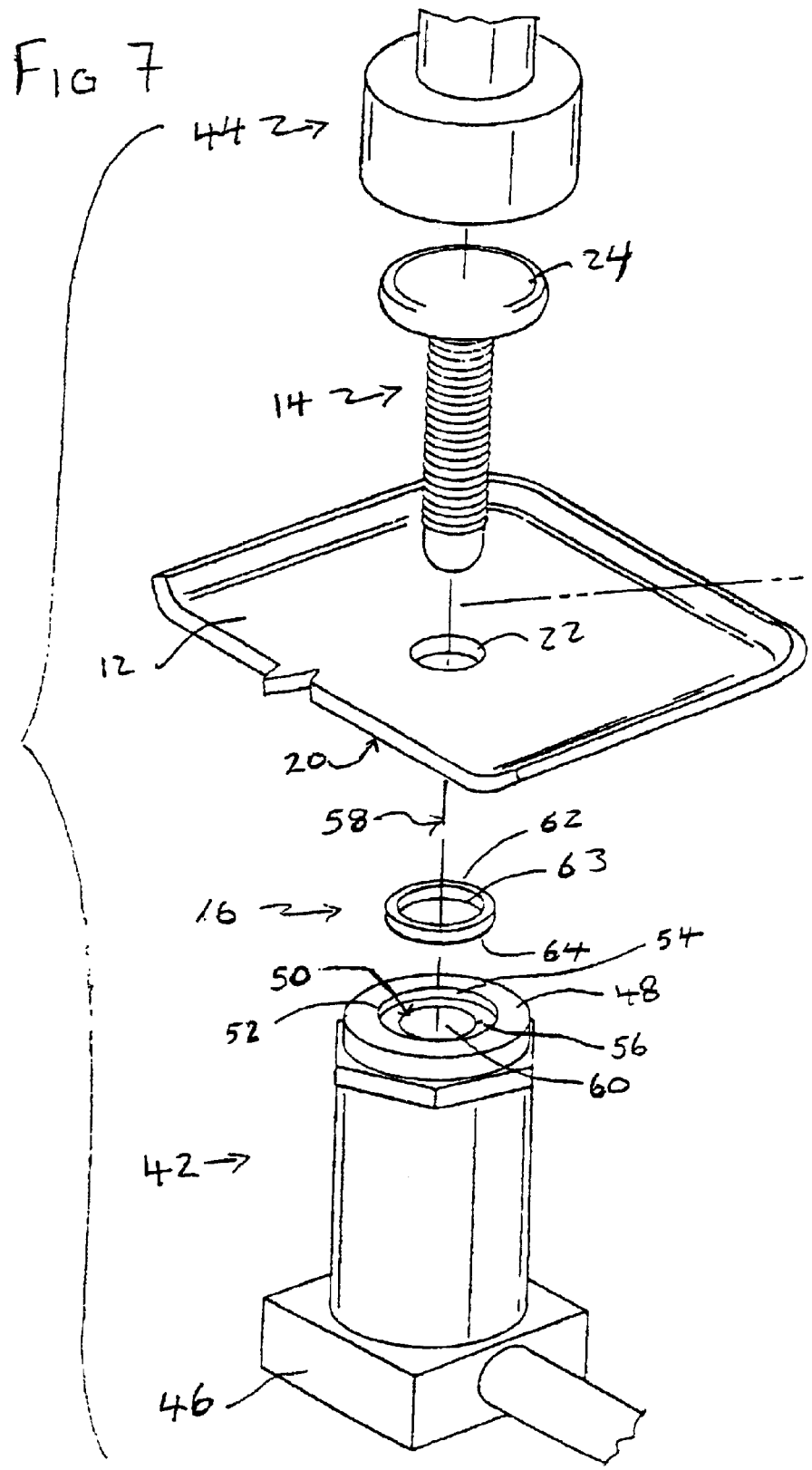

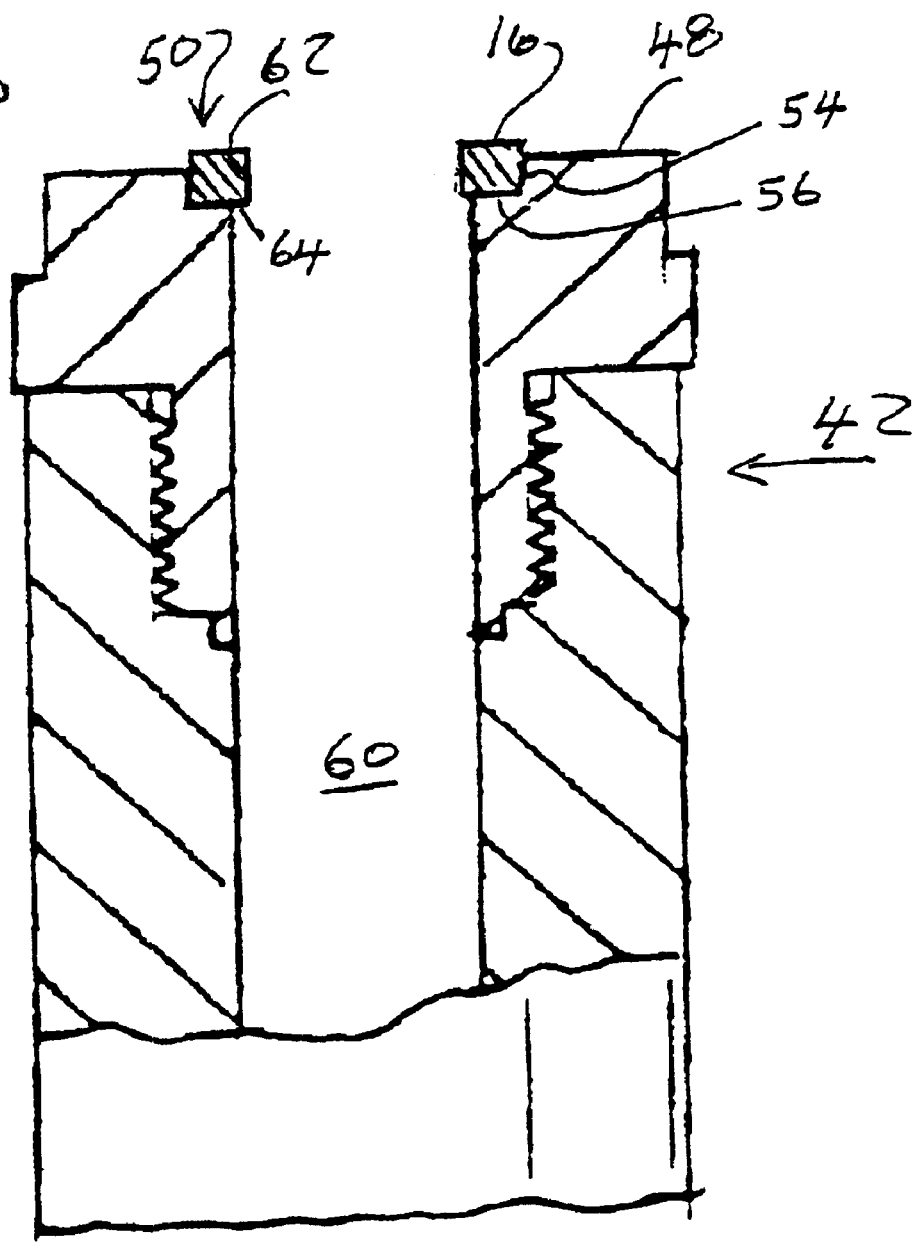

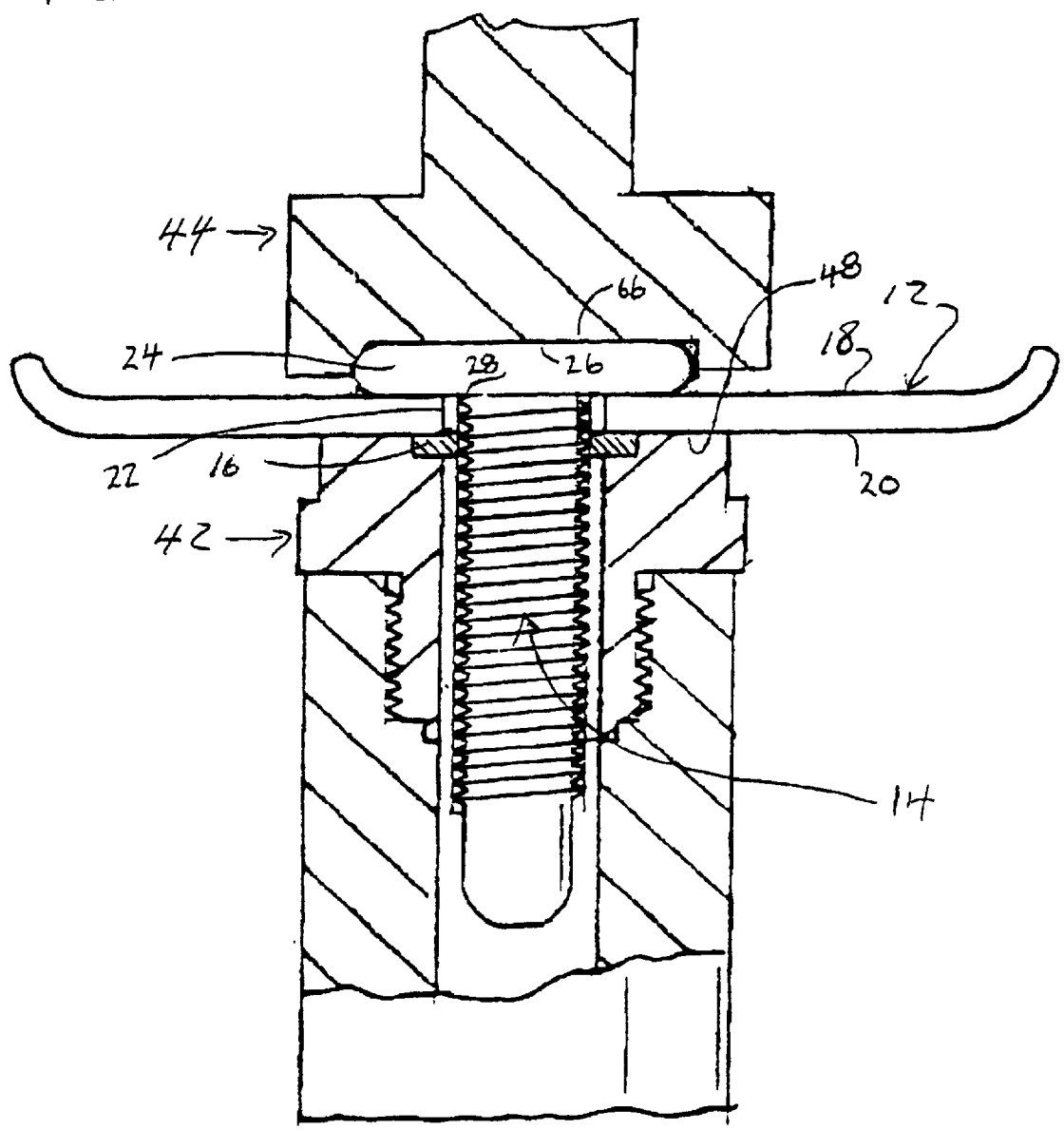

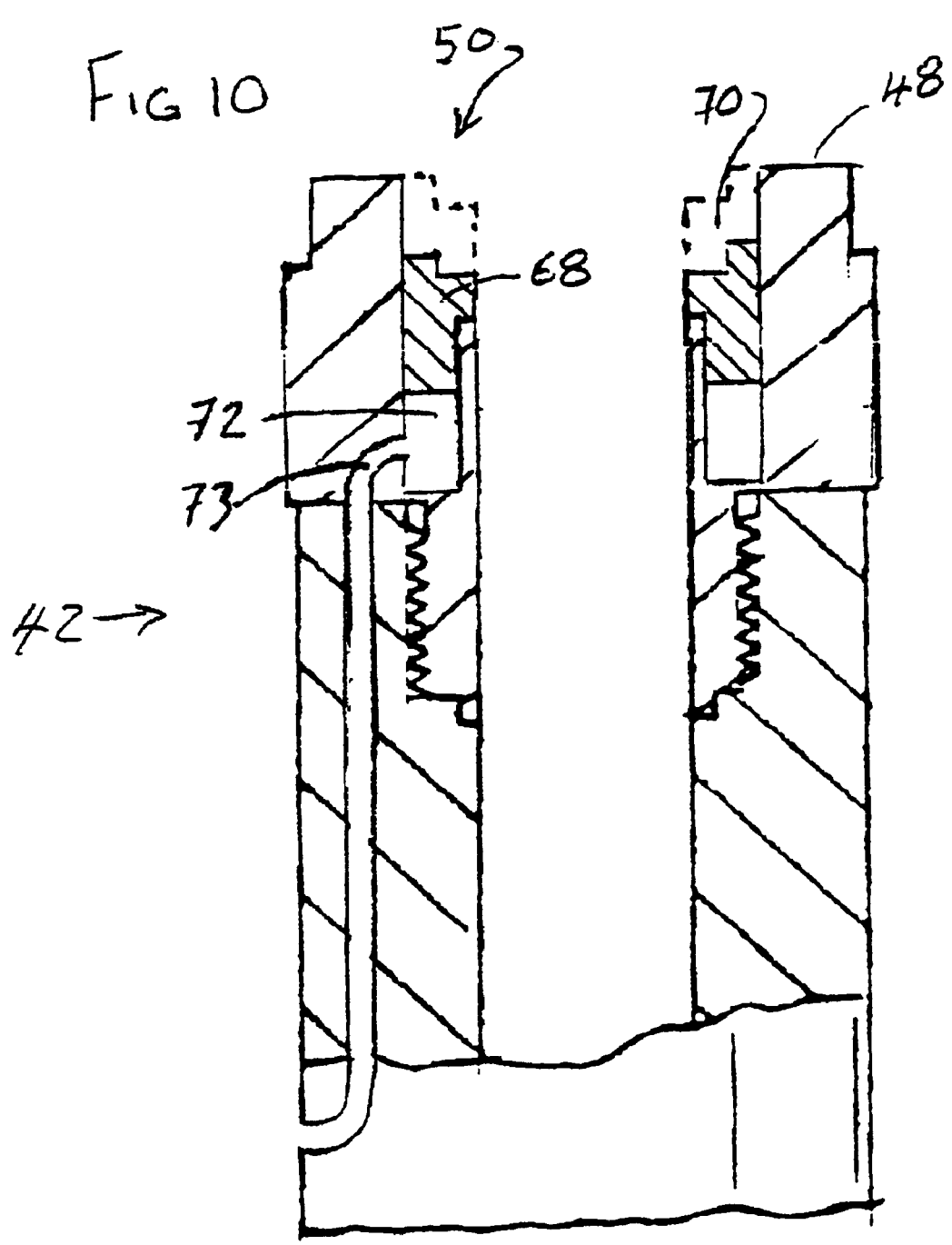

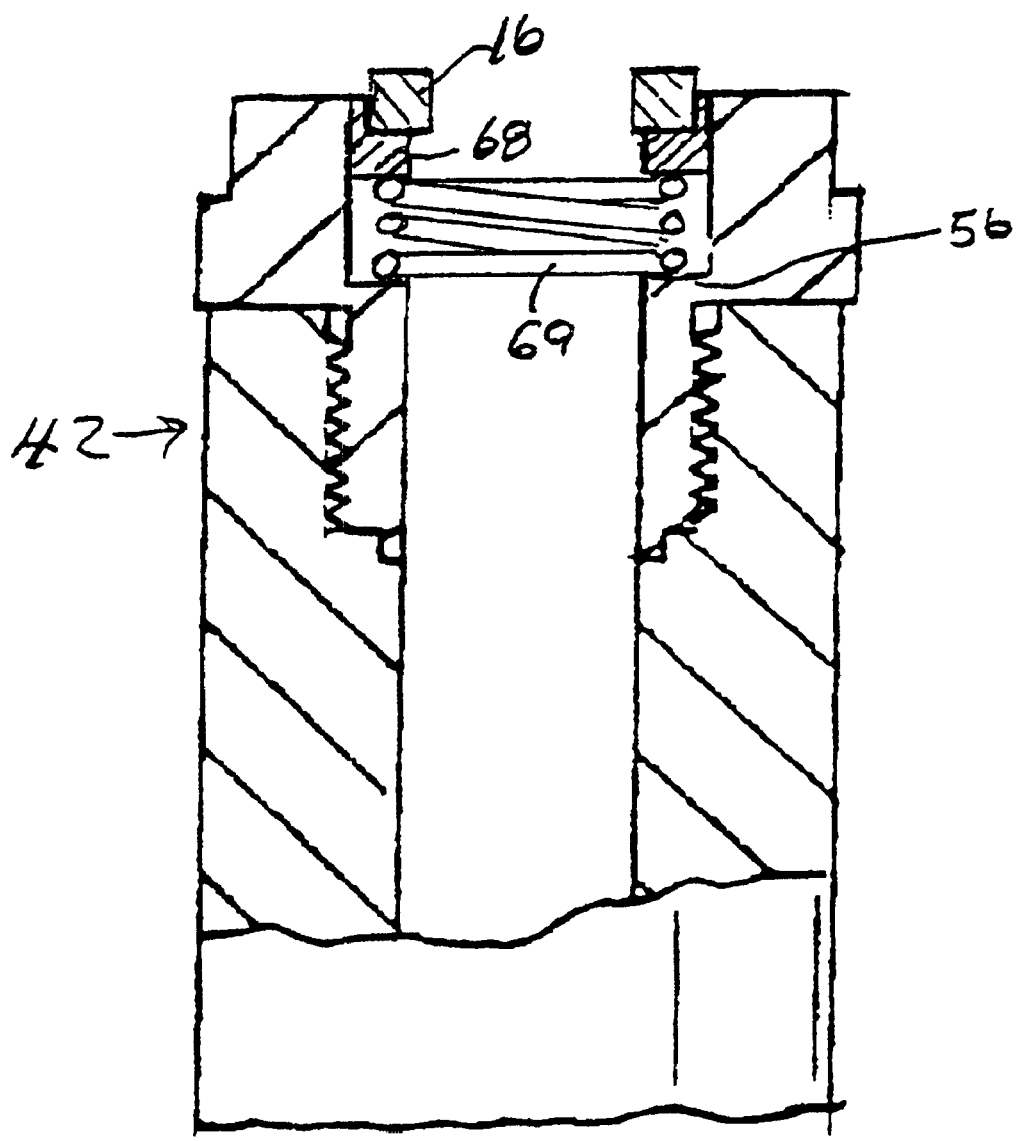

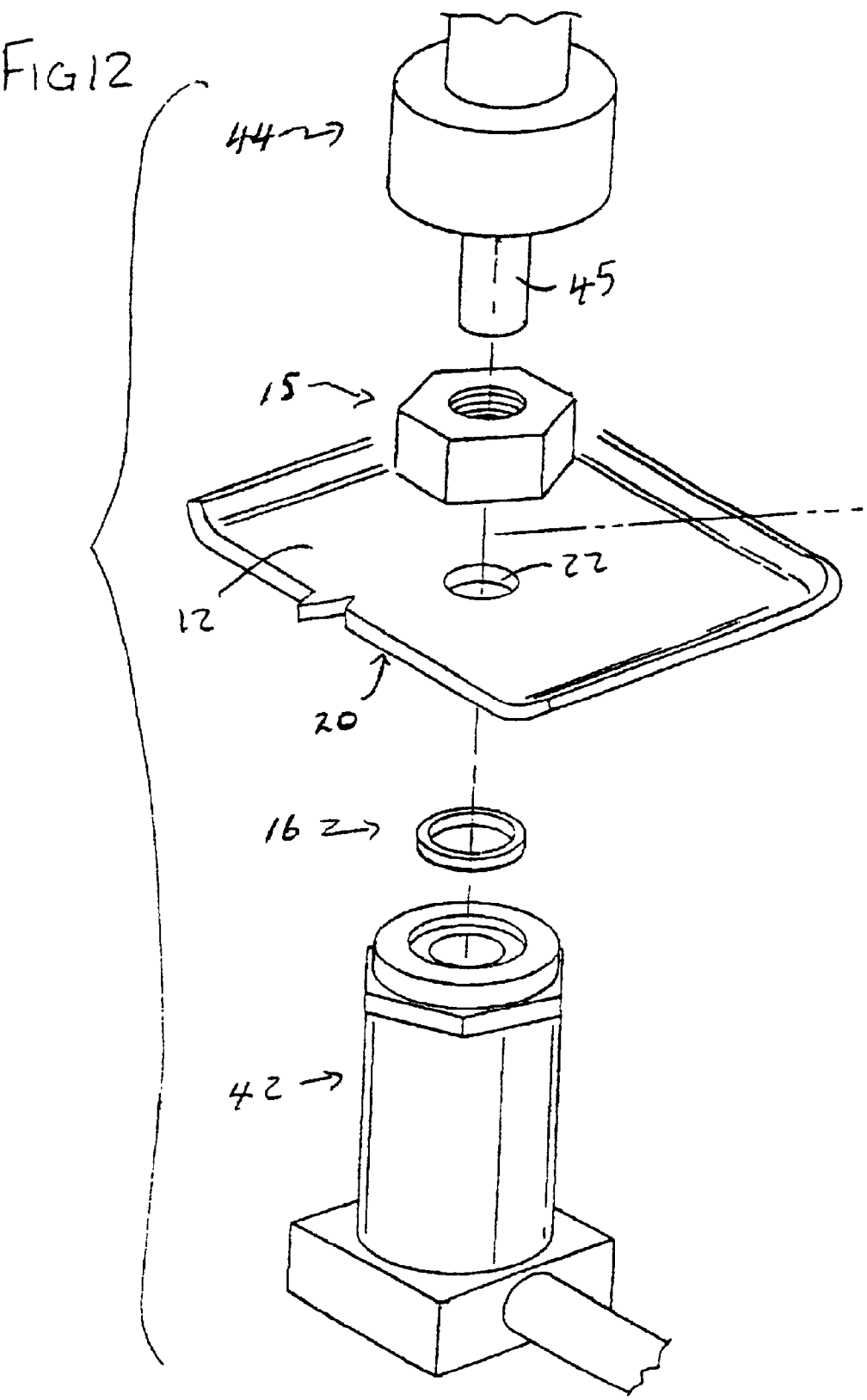

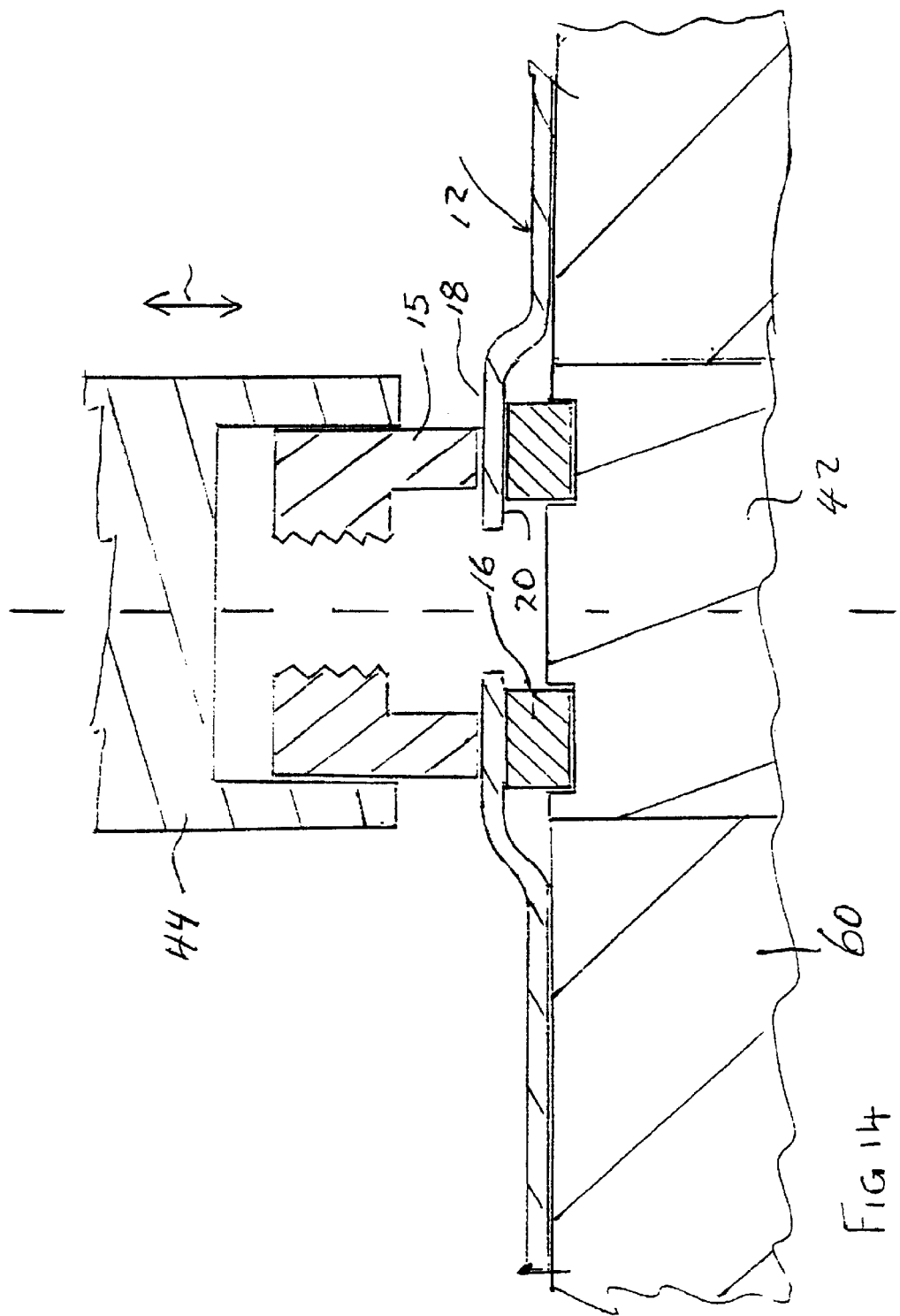

ADHERING SEALING MEMBER TO METAL WITH WELD HEAT

SCOPE OF THE INVENTION

The present invention relates to a process for securing a sealing member to a first metal element proximate a weld joining the first metal element to a second metal element.

BACKGROUND OF THE INVENTION

Sealing members are well known as typically provided between two components to seal a juncture between the components. One example of use of a sealing member is in the context of a unitized body of an automobile. Components that are to be bolted to the body from the underside of the body requires sealing such that no environment such as water, air or exhaust gases may leak into the passenger compartment.

An automotive sealing fastener component is known useful, for example, to secure seating frames to the sheet metal floor of a passenger compartment in a unitized automotive body. This fastening component comprises a plate of metal with an opening therethrough and a metal stud extending through the opening with a head of the stud welded to a first, lower surface of the plate and extending through the plate opening to extend beyond a second upper surface of the plate. The fastening component is provided to be located underneath the sheet metal floor of the body with the stud to extend upwardly through an aperture in the floor to be engaged by a free nut to draw the fastening component upwardly. A sealing washer is secured to the second upper surface of the plate about the stud so as to become sandwiched between the plate and the floor and thereby provide a seal.

One known multi step method for manufacturing such seating fastening component involves one step of welding the stud to the plate and another, separate step of applying the sealing washer and securing the sealing washer to the plate. One known sealing washer used has an adhesive on one side of the washer such that by removal of the washer from a release sheet carrier, the washer may be located over the stud and adhered to the second surface of the plate. Such self-adhering sealing washers suffer the disadvantage that the sealing washer is relatively expensive to manufacture. A further disadvantage is that the metal plate frequently carries a film of oil on its surface which prevents the adhesive from securely bonding the washer to the metal plate or requires additional processing to remove the oil. Other disadvantages are the high labour costs to manually apply the seals and the high costs of automation.

Another known sealing washer used with the known multi step method is a washer which is applied onto the second surface of the plate and then heated with the metal component by an induction heater. The induction heater heats the metal component to a temperature such that a surface of the washer in contact with the metal component melts to become adhered to the metal component. During heating, pressure may be applied to urge the washer into the plate. Such method suffers the disadvantage that time and energy are consumed in heating the component. A further disadvantage is that heating of the metal component is not always consistent and improper heating and poor adhesion can arise.

Previously known methods for sealing the washers to the metal component and the washers used therewith have been appreciated by the applicant as having the substantial disadvantage as involving a separate step from that of welding the fastener stud to the metal plate.

SUMMARY OF THE INVENTION

To at least partially overcome these disadvantages of the previously known methods, the present invention provides for heat sealing of a sealing member to a first metal element using heat generated in securing the first metal element to a second metal element.

An object of the present invention is to utilize heat generated in securing two elements together to secure a sealing member to one of the two elements.

A further object is to secure a sealing member to a metal component in the same step as elements of the component are secured together by a process generating heat.

A further object is to provide an electrode for welding which permits a sealing washer to be secured to a metal surface in the same step as welding with the electrode, preferably without relative movement or repositioning of the electrode or metal surface other than that normally included in the welding process.

Another object is to provide a simplified process for securing sealing washers to metal components.

Another object is to provide an improved connecting plate component with a sealing element secured thereto.

Accordingly, in one aspect the present invention provides a method of securing a sealing washer to one surface of a metal sheet while securing a fastener to a second surface of the metal sheet, the sealing washer comprising a material which when heated to above a minimum fusing temperature and subsequently cools bonds to metal, the method comprising:

securing the fastener to the second surface of the sheet by a process which heats the metal sheet including the first surface of the metal sheet over a portion proximate the fastener to a temperature above the minimum fusing temperature, and engaging the portion with the sealing washer while the portion is at a temperature above the minimum fusing temperature and subsequently cooling the portion. Preferably, the minimum fusing temperature is in the range of 70° to 140° C.

In another aspect, the present invention provides a method of securing a sealing washer to one surface of a metal sheet while welding a fastener to a second surface of the metal sheet;

the method comprising:

welding the fastener to the second surface of the sheet in a manner which heats a first portion of the first surface proximate the fastener urging a sealing washer into the first surface where heated by the welding to heat fuse the sealing washer to the first surface. Preferably, the welding is selected from resistance welding and drawn-arc welding.

In another aspect, the present invention provides a method of securing a sealing washer to one surface of a metal sheet while welding a head of a fastener to a second surface of the metal sheet;

the method comprising:

compressing the head onto the second surface of the sheet between a first electrode engaging the head and a second electrode engaging the first surface of the sheet, welding the head to the second surface of the sheet by electrical resistance welding to heat the first surface of the sheet proximate to the first electrode, urging a sealing washer into the heated first surface with the second electrode to heat the sealing washer and thereby bond the sealing washer to the first surface.

Accordingly, in another aspect, the present invention provides a washer holder, preferably comprising an electric resistance welding electrode, the holder having a face to engage a surface of a metal element, a socket extending into the holder from the face to a socket end, the socket adapted to receive a seal member therein and for urging the seal member into the surface of the metal element while the face engages the surface.

In another aspect the present invention provides a connecting plate comprising a metal sheet having a first surface and a second surface with an opening therethrough, a metal nut having an aperture therethrough, the nut welded to the first surface with the aperture of the nut in alignment with the opening, a sealing washer with a hole therethrough, the sealing washer secured to the second surface with the hole of the washer in alignment with the opening, the washer having been secured to the second surface by a process including urging the washer onto the second surface while heating the washer with heat generated by welding of the nut to the metal sheet.

In another aspect, the present invention provides a connecting plate comprising a metal sheet having a first surface and a second surface with an opening therethrough, a stud having a head and a shank extending therefrom, the head of the stud welded to the first surface with the shank extending through the opening, a sealing washer with a hole therethrough, the sealing washer secured to the second surface with the hole of the washer in alignment with the opening, the washer having been sealed to the second surface by a process including urging the washer onto the second surface while heating the washer with heat generated by welding of the head of the stud to the metal sheet.

BRIEF DESCRIPTION OF THE DRAWINGS

Further objects and aspects of the present invention will become apparent from the following description taken together with the accompanying drawings in which:

FIG. 1 is a pictorial view of a connecting plate component in accordance with a first embodiment of the invention;

FIG. 2 is a cross-sectional view along section line 2—2' in FIG. 1;

FIG. 3 is a schematic exploded view longitudinally through the connecting plate of FIG. 1 and showing coupling to a seat support through a floor sheet of an automotive body;

FIG. 4 is a pictorial view of a connecting plate component in accordance with a second embodiment of the invention;

FIG. 5 is a cross-sectional view along section line 5—5' in FIG. 4;

FIG. 6 is a schematic exploded view similar to that of FIG. 3 but with the connecting plate of FIG. 4;

FIG. 7 is a schematic pictorial view showing an embodiment of an apparatus for securing together the elements of the component shown in FIG. 1;

FIG. 8 is a cross-sectional side view through a first embodiment of an electrode shown in FIG. 7 with a sealing washer in place;

FIG. 9 is a cross-sectional side view through the apparatus of FIG. 7 positioned to weld metal elements of the component together;

FIG. 10 is a cross-sectional side view similar to FIG. 8 but of a second embodiment of the lower electrode;

FIG. 11 is a cross-sectional side view similar to FIG. 8 but of a third embodiment of the lower electrode;

FIG. 12 is a schematic pictorial view similar to FIG. 7 of an apparatus for securing together the elements of the component shown in FIG. 4;

FIG. 14 is a schematic cross-sectional view of an embodiment of an apparatus for securing a washer to a thin sheet and a nut together by a drawn-arc welding process.

DETAILED DESCRIPTION OF THE DRAWINGS

Figure 13:
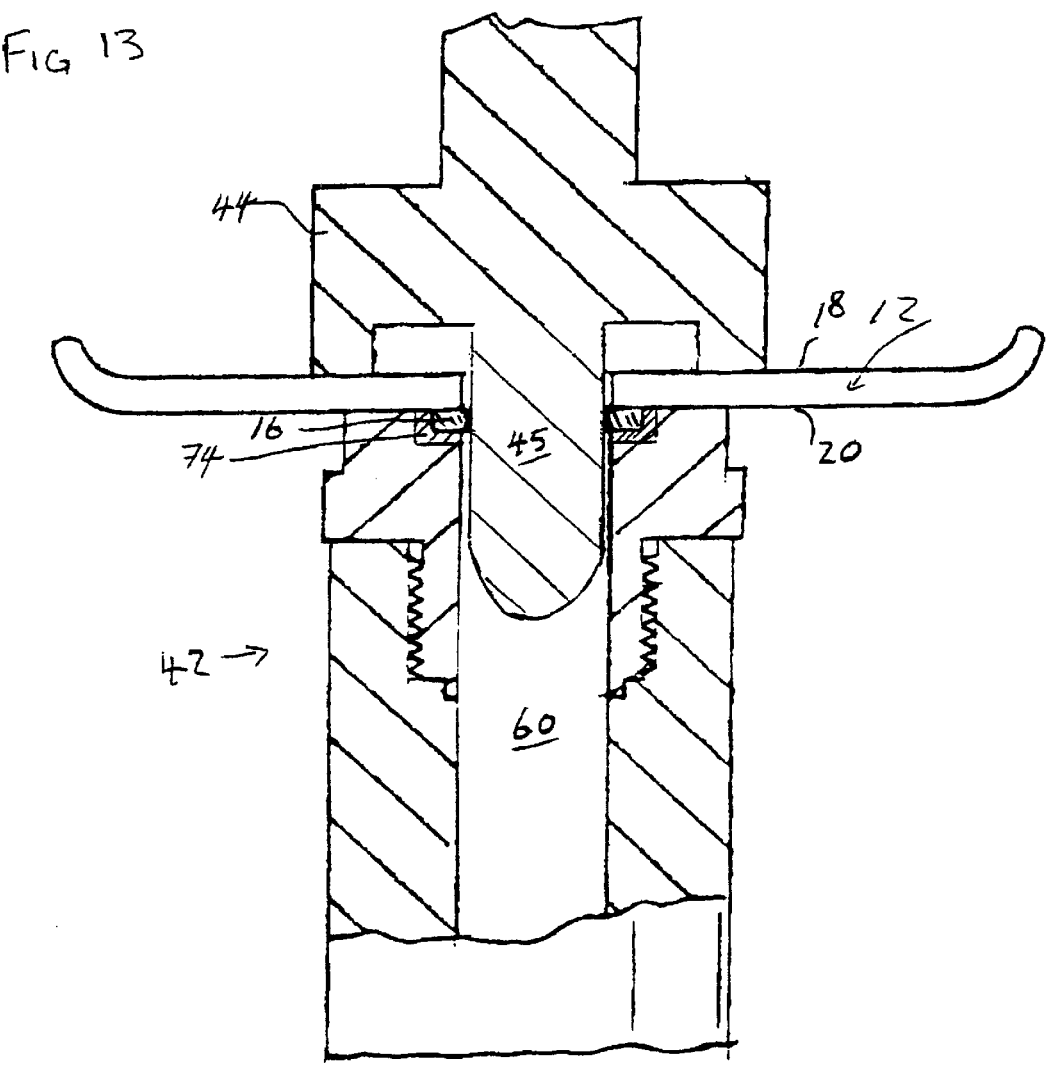
FIG. 13 is a cross-sectional view similar to FIG. 9 of the apparatus of FIG. 12.

Reference is made to FIGS. 1 to 3 which show a preferred embodiment of a connecting plate component 10 in accordance with the present invention. Component 10 comprises a plate 12, two studs 14 and two sealing washers 16.

Plate 12 has a first surface 18, a second surface 20 and two openings 22.

Stud 14 has an enlarged head 24 with an outer surface 26 and an undersurface 28 from which a threaded shank 30 extends.

The sealing washers 16 are shown as planar annular members with two surfaces 62 and 64 and a hole 63 therethrough.

The undersurface 28 of stud 14 is secured to first surface 18 of plate 12 with the shank 30 in alignment with and extending through the opening 22 of plate 12. Sealing washer 16 is secured to the second surface 20 of the plate 12 aligned about the first opening 22 circumferentially thereabout.

As seen in FIG. 3, the component 10 as schematically shown in FIG. 1 is adapted for securing to the undersurface 36 of a metal sheet 32 of the floor of a unified automobile body having two holes 34 therethrough located at complementary locations to the openings 22 in the plate 12. The shanks 30 of the studs 14 extends upwardly through the openings 34 in sheet 32 and through similar openings 35 in a seat support member 37 to be secured to the automotive body. A free nut 38 is received on each shank 30 such that tightening of the free nut 38 draws the second surface 20 of component 10 toward the undersurface 36 of the metal sheet 32 to sandwich and compress the sealing washers 16 therebetween and thereby form a seal to prevent environment from passing through the metal sheet 32.

Reference is made to FIGS. 4 to 6 which are similar to FIGS. 1 to 3 but show the component 10 having a nut 15 in substitution of the stud 14. Nut 15 has an outer surface 27 and an undersurface 29 with an aperture 31 therethrough which is shown as threaded.

The undersurface 29 of nut 15 is secured to the first surface 18 of the plate 12 with the aperture 31 of the nut in alignment with the opening 22 of the plate 12. Sealing washer 16 is secured to the second surface 20 of the plate 12 aligned about the opening 22 circumferentially thereabout. As seen in FIG. 6, a free bolt 40 extends downwardly through hole 35 and opening 22 to threadably receive the nut 15 on the plate 12.

While the plate 12 has been shown with two openings 22, it could be provided with one or more openings. The component 10 has been shown with two different threaded fasteners, namely, a stud 14 and a nut 15. Only one fastener may be provided for each plate 12. Two or more fasteners may, however, be provided of the same type or different and fasteners may be male and/or female threaded fasteners or of other non-threaded fastener types.

Reference is made to FIGS. 7 to 9 which show an apparatus for securing the plate 12, stud 14 and washer 16 together to form the component 10 of FIG. 1.

This apparatus includes a lower electrode 42 and an upper electrode 44 mounted for movement towards each other as with the lower electrode 42 supported on a base 46 and the upper electrode 44 mounted to a press mechanism (not shown) for vertical movement relative the lower electrode 42.

The lower electrode 42 has an annular face 48 adapted for contact with the second surface 20 of the plate 12. A socket 50 extends into the electrode 42 from the face 48 and is adapted to receive the washer 16 therein. Socket 50 has an opening 52 in the face 48, a side wall 54 and a socket end wall 56. As seen, the socket 50 is generally circular in cross-section about a socket axis 58. A central bore 60 extends through the socket 50 to coaxially receive and locate about the shank 30 of the stud 14. The socket end wall 56 is an annular shoulder facing towards the socket opening 52. Side wall 54 is preferably cylindrical as shown and sized to receive a washer 16 therein to coaxially locate the washer.

The socket 50 preferably is adapted to urge the washer 16 into the second surface 20 of the plate 12. In this regard, in the first embodiment of the socket 50, as best seen in FIG. 8, the socket 50 has a depth from the face 48 to the socket end wall 56 which is less than the thickness of the washer 16 as measured between first and second surfaces 62 and 64 of the washer. The washer 16 is preferably chosen to be at least partially compressible such that when, as seen in FIG. 9, the first electrode 42 is forced into the second surface 20 of the plate sufficiently to place the face 48 of the electrode into contact with the second surface 20, the washer 16 becomes urged and thereby compressed onto the second surface 20.

A washer which is not compressible could be used, for example, by appropriate selection of the depth of the socket 50 having regard to the depth of the washer.

In use in the position of FIG. 9 with the first and second electrodes 42 and 44 being urged together with the face 48 of the first electrode 48 engaging the second surface 20 of the plate and with a face 66 of the second electrode 44 engaging the outer surface 26 of the head 24 of the stud 14, the electrodes may be used to weld the first surface 18 of the plate 12 to the undersurface 28 of the head of the stud as by electric resistance welding.

Welding is carried out by passing an electric current between the electrodes 42 and 44 to weld the stud 14 to the plate 12 and heat a portion of the plate 12 proximate the stud 14 sufficiently that washer 16 is heated and thereby becomes bonded to the second surface 20 of the plate. On completing of the welding, the sealing washer 16 cools and remains secured to the component.

Washer 16 may become secured to the plate 12 in a manner to merely bond to the plate or, alternatively, it may not only bond to the plate 12 but may also form a seal which seals against the environment passing through the annular space of the opening 22 between the plate 12 and the stud 14. It is not necessary that this annular space be sealed since the washer 16 will in use on attachment of the component 10 to an automotive body come to be compressed to form a seal between the component 10 and the automotive body. The washer 16 needs only to be secured to the component 10 sufficiently that the washer 16 will not become detached from the remainder of the component 10 in handling prior to coupling to an automotive body.

While the washer 16 may become bonded to the second surface 20 over the entire surface 62 of the washer, bonding it merely at one point, more preferably, at least two and, more preferably, three circumferentially spaced locations about the washer is preferred. Welding may be focused at one point or, more preferably, at two, and more preferably three circumferentially spaced points circumferentially about the head of the stud with increased heat generated proximate each localized weld point. The heat at each localized weld point can provide localized bonding of the washer 16 at corresponding locations. Typically, however, the heat produced at the points creates enough heat to heat a ring-like portion of the surface circumferentially about the opening 22 and, therefore, the entire surface of the washer 16 becomes bonded to the second surface 20.

FIGS. 12 and 13 show an apparatus similar to that of FIGS. 7 and 9 but adapted for use with a nut 15 and in which the upper electrode 44 carries a cylindrical post 45 to extend down into the nut 15. The lower electrode 42 shown is particularly adapted for welding the stud 14 but is also suitable for welding nut 14. However, for welding of a nut, the electrode 42 does not require the bore 60. Preferably for use with a nut 14, the electrode 42 will not have the central bore 60 and the socket may merely comprise an annular groove which can constrain the washer 16 against deflecting and spreading radially inwardly excessively.

The portions of the socket and/or piston which are to contact the washer may have non-stick surfaces such as Teflon brand, carbon tetraflouride materials. FIG. 13 shows a sleeve-like insert 74 removably secured in the electrode and preferably having a surface which reduces adhesion of the washer when heated. Surface coatings and/or similar removable inserts may also be made of materials which minimize heat transfer so as to prevent heating of the surfaces of the washer engaging the socket by heat transfer through the insert and thereby decrease the likelihood of the washer sticking to the inserts and, therefore, the electrode, socket and/or piston. Cooling systems (not shown) may be provided to prevent undue heating of portions of the electrode to which it is not desired the washer adhere.

The sealing washer 16 is shown as an annular washer with a central hole 63. A modified washer 16 (not shown) could be provided without the hole 63 for use with a nut 15. In assembly of the component 10 to a metal sheet 32 as by fasteners other than those which extend through the surface of such a modified washer 16, the modified washer can form a seal to close the hole 34 through the metal sheet 32 with the modified washer forming a fragile membrane extending across the hole 34 which can be cut out or broken if a free bolt may later be used to extend through the hole 34 into the nut 14.

FIG. 10 shows a second embodiment of electrode 42 having a piston 68 disposed in the socket 50 for movement coaxially in the socket 50 between a retracted position shown in solid lines in which the piston 68 is disposed rearward from the face 48 and a forward position shown in dashed lines forward towards the face 48 than the retracted position. A washer reception space 70 is provided in the socket 50 outwardly of the piston 68 to receive a washer 16 (not shown). Movement of the piston 68 from the retracted position towards the forward position moves the washer forwardly in the socket.

The depth of the washer reception space 70 can preferably be selected having regard to the thickness of the washer 16 such that with the piston 68 in the retracted position, the washer 16 is received in a socket spaced rearwardly from the socket opening 52 and thereby away from the second surface 20 of the plate 12.

Movement of piston 68 can be controlled to provide preferred bonding of the washer 16. For example, movement of the piston 68 can be controlled as relative to:

1. timing of the welding process;
2. the length of time the washer is urged into the plate;
3. the pressure with which the washer is urged into the plate;
4. the nature of the washer including its material, thickness and shape; and
5. the temperature of the plate, stud and/or electrode as may be measured at varying locations.

The piston 68 is adapted to be pneumatically controlled, that is, urged forwardly as by applying increased air pressure in a chamber 72 formed in the socket 50 rearward of the piston 68, and drawn rearwardly as by applying a vacuum to the chamber 72. Air can be forced into the chamber 72 or removed therefrom via air passageway 73. Other mechanisms to move the piston 68 include hydraulic pistons, threaded activators and the like. FIG. 11 shows an embodiment in which piston 68 is biased forwardly as by a spring 69 disposed in the chamber 72 between the socket end wall 56 and the piston 68 to urge the piston forwardly under a pressure dictated by the spring.

The present invention provides a method for securing metal components together at the same time as securing a sealing washer to the metal components. The method includes bonding the metal components together by a bonding process generating heat, urging the sealing member into one of the components at a location on one of the components where sufficient heat is generated to heat and thereby bond the sealing washer thereto.

In the context of the apparatus shown in FIGS. 7 to 9, the method involves:

placing a washer 16 in the socket 50 in the electrode 42;

placing the plate 12 on top of the electrode 42 with its second surface 20 facing downwardly and its opening 22 in alignment with the bore 60 in the socket 50;

placing the stud 14 with its shank 32 extending through the opening 22 down into the central bore 60 in the socket;

locating the upper electrode 44 on the head 24 of the stud 14 to compress the stud 14 into the plate 12;

passing electrical current between the electrodes 42 and 44 to form a weld joint between the stud and the plate generating heat to heat the second surface 20 of the plate, and;

urging the washer 16 into the second surface 20 of the plate 12 while such second surface is sufficiently hot to bond the sealing washer 16 thereto.

In accordance with the first embodiment of the electrodes shown in FIGS. 7 to 9 and 11, at all times during the welding operation, the sealing washer 16 is urged into the second surface 20 of the plate.

In accordance with the embodiment of the electrode shown in FIG. 10, one possible mode of operation is to hold the piston 68 in the retracted position at the time when current is passed through the electrodes to form the weld and thereby keep the sealing washer 16 out of contact with the second surface 20 until after the weld is complete. Promptly after the electric current is no longer being passed through the electrodes, the piston 68 may then be activated to then urge the washer 16 into contact with the second surface 20 to heat the sealing washer and bond it to the second surface 20. To the extent that the quantity of heat generated in forming the weld may be too large as, for example, so large as to unduly melt and deform any particular washer, urging the washer into the second surface 20 after some time delay from commencement or finishing of the weld may be advantageous. In another mode of operation, the piston 68 could be used to urge the sealing washer 16 into contact with the second surface 20 initially with a first lesser pressure and, subsequently, with an increased pressure as, for example, to permit the washer to become heated to become somewhat deformable under lesser pressure and then to be forcefully urged into the second surface 20 and deformed with the piston effectively forming a mold cavity.

Many manners of control of the operation of the piston 68 may be provided.

The electrodes shown are particularly adapted for use in securing the fastener to the metal sheet by electric resistant welding. Other welding processes may be used including drawn-arc welding, capacitance discharge and MIG welding.

As is to be appreciated by persons skilled in the art, different welding processes may require different techniques for holding the metal elements together and/or different electrodes to that disclosed for resistance welding.

For example, drawn-arc welding is advantageous when the metal sheet is relatively thin, for example, of 1 mm thickness or less. Resistance welding is often not feasible with such thin sheets as the clamping pressures desired in resistance welding to clamp the sheet and fastener between two electrodes can often deform such thin metal sheets.

Reference is made to FIG. 14 which is a schematic cross-sectional side view of an apparatus for drawn-arc welding of a nut 15 onto a first surface 18 of a thin sheet 12 of metal and with a sealing washer 16 to become bonded to a second surface 20 of the sheet 12.

As shown, the nut 15 is held in an electrode 44 which is, in a known manner, adapted to move upwardly and downwardly in the arc welding process. The washer 16 is held in a washer holder 42 which is similar in shape to the electrode 42 shown in the other figures but does not function as an electrode in the drawn-arc welding process as is known. The holder 42 is shown received in a lower support member 60 which can preferably be provided to help support sheet 12.

The nut 15 is shown as having an aperture 31 therethrough. The aperture 31 has an enlarged diameter portion 62 proximate the end of the nut 15 to engage the sheet 12 and a reduced diameter portion 64 at the other end which is threaded.

In a typical drawn-arc welding process, the nut 15 is securely held in the electrode 44. The electrode 44 moves the nut vertically during the process. The electrode first places the nut into contact with the sheet 12 for engagement under little or no pressure. A small amount of current is fired, that is, passed between the electrode 44 and the sheet 12 through the nut 15.

The nut 15 is lifted by the electrode 44 a small distance above the sheet 12 and, while separated from the sheet, a large current is fired to pass from the nut 15 to the sheet. This large current forms an arc between the nut 15 and sheet 12 which melts both surfaces of the nut 15 and of the sheet 12. The nut 15 is then promptly moved down into engagement with sheet 12 and fusion between the nut 15 and sheet 12 is completed. Heat generated by the welding heats the second surface 20 of the sheet 12 sufficiently to bond the washer 16 thereto. The washer 16 is shown as engaged with the sheet 12 by the washer holder 42 which does not necessarily function as an electrode.

Various other processes and methods of bonding two metal elements together can be utilized by which a heat may be generated which can be utilized to secure the sealing member to one of the metal elements. For example, bonding the metal together by brazing or soldering could be used and depending upon the quantities and absolute temperatures of the heat generated, the sealing member could then, in a controlled manner, be urged into contact with the heated second surface as, for example, as controlled by appropriate temperature sensing of the temperature of the second surface 20.

In the preferred embodiment for electric resistance welding, the electrode forms a carrier to hold the sealing element and to urge the sealing element into contact with the heated second surface 20. It is to be appreciated that for other processes and for joining the two metals together, an electrode may not be required in which case, rather than being utilized as electrodes, those elements which are shown as electrodes in the Figures may comprise top and bottom members of a mechanical press as, for example, to compress the two components desired to be secured together by a process in which heat is generated such that concurrently therewith or substantially immediately thereafter the sealing member may be urged into the heated surface to which the sealing member is desired to be sealed.

The sealing washer may be formed from various different materials. Preferred materials are plastic and/or rubber materials which, on the application of heat, adhere to metal. The nature of the sealing member may be such that the composition of which it is formed melts and thereby adheres or possibly is chemically altered by heat treatment. The washer member may have a unitary composition throughout or may comprise a laminate with the components to engage the metal being adapted for bonding under heat conditions.

Preferred washers are compressible, elastomeric materials. A preferred washer may be formed from vinyl, polypropylene, polyethylene materials and may be preferably extruded into a tube which is cut axially into slices to provide inexpensive annular washer elements. Such annular washer elements are known and have been used, for example, in the past in multi step processes for bonding of the washer to a metal element by a separate step of induction heating. The sealing member is preferably selected having regard to the temperature to which heated second surface 20 may be heated. For example, the second surface 20 may be controlled to be heated to a minimum fusing temperature, being a temperature which the sealing member will be sure to become bonded to the second surface 20. For many commercially available sealing members preferred minimum fusing temperatures are at least 70° C. with fusing temperatures preferably in the range of 70° to 140° C. Preferably, the sealing member will, after bonding to the second surface, be capable of withstanding 54° C. for 72 hours without becoming unstable. The materials of the sealing member and the minimum and maximum fusing temperatures may be varied and selected having regard to the nature of the bonding process to join the metal components together and produce heat.

The embodiments illustrated show stud 14 as having a shank 30 which is threaded and nut 15 as having an aperture 31 which is threaded. Neither of the stud nor nut need be threaded and unthreaded studs and nuts are common for application as ground nuts and locating studs.

While the invention has been described with reference to preferred embodiments, many modifications and variations will now occur to persons skilled in the art. For a definition of the invention, reference is made to the appended claims.

I claim:

1. A method of securing a sealing washer to one surface of a metal sheet while bonding a fastener to another surface of a metal sheet;

the method comprising:

providing a sealing washer which when engaged with a heated surface bonds to such surface, providing a metal sheet having an opening therethrough, providing a fastener having a head, bonding the head of the fastener to a first surface of the metal sheet about the opening by a process which to achieve such bonding heats a second surface of the metal sheet proximate to the fastener about the opening, urging the sealing washer onto the second surface about the opening while still heated from the fastener bonding step thus heating the sealing washer and thereby bonding the sealing washer to the second surface about the opening, wherein the sealing washer is urged into the heated second surface while the sealing member is held in a washer holder having a face with a socket extending into the holder from the face and adapted to receive the washer therein for urging the washer into contact with the second surface, wherein the socket extends into the holder to a socket end, a piston is slidably disposed within the socket, a washer reception space is provided in the socket outwardly from the piston, the piston is biased outwardly from the socket and thereby urges the washer onto the second surface.

2. A method as claimed in claim 1 wherein the piston is movable between a retracted inner position and an outer position, in the retracted inner position, the washer reception space is provided in the socket between the piston and the face of sufficient depth to receive the washer fully within the socket and spaced inwardly from the face, in movement of the piston towards the outer position, the piston urges the washer onto the second surface.

3. A method as claimed in claim 1 including a mechanism to move the piston between the inner and outer positions and control the timing of when the piston urges the washer into the second surface relative to when the first surface is heated.

4. A method as claimed in claim 3 wherein the mechanism comprises a pneumatic mechanism.

* * * * *